Figure 1:
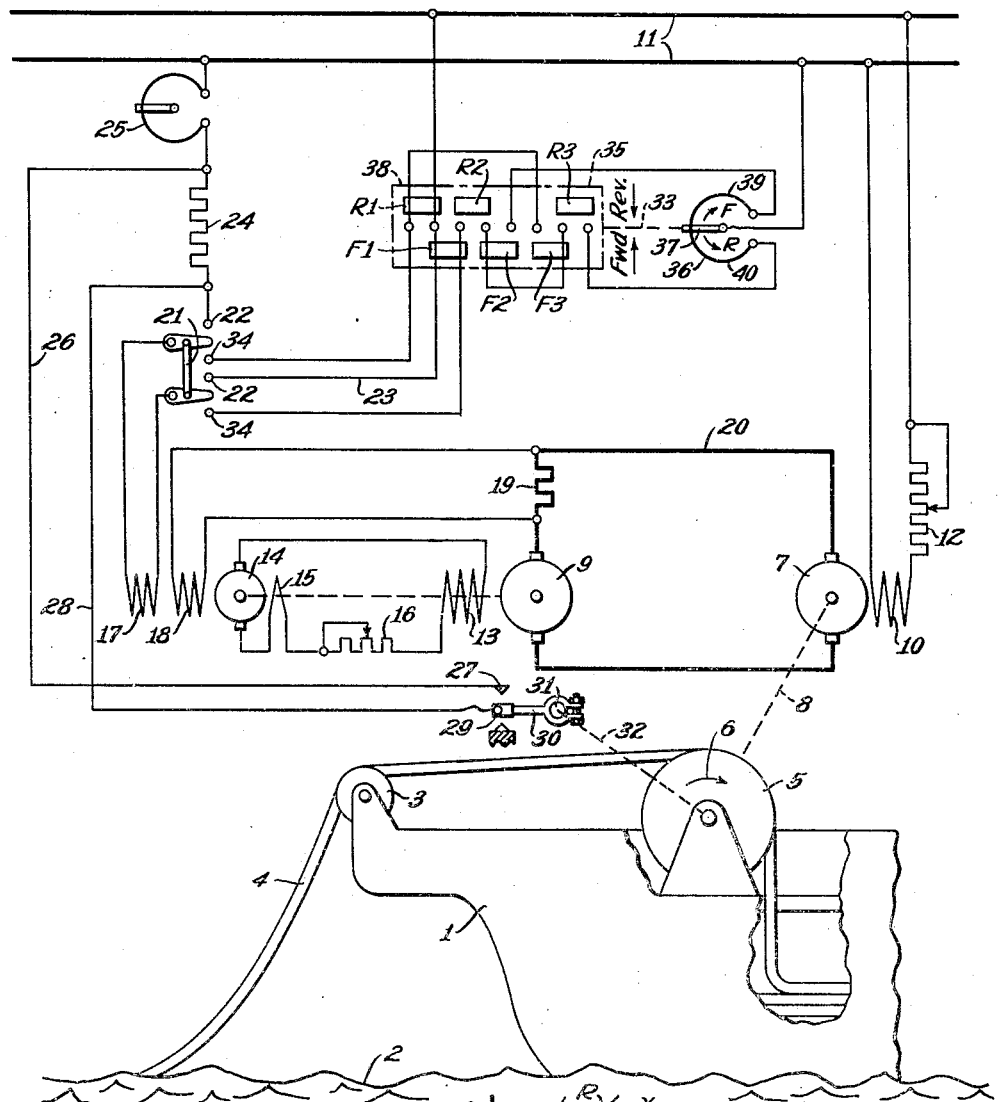

July 19, 1949.        K. MAHNKE        2,476,883
CABLE LAYING APPARATUS
Filed June 19, 1947

WITNESSES:
Robert C Baird
W L Young

INVENTOR
Kurt Mahnke
BY
Paul E. Friedemann
ATTORNEY

Patented July 19, 1949

2,476,883

UNITED STATES PATENT OFFICE 2,476,883

CABLE LAYING APPARATUS

Kurt Mahnke, Pittsburgh, Pa., assignor to Westinghouse Electric Corporation, East Pittsburgh, Pa., a corporation of Pennsylvania Application June 19, 1947, Serial No. 755,645

9 Claims. (Cl. 318—6)

This invention relates to marine cable laying apparatus and more particularly to an improved control system for controlling the operation of the cable drum employed on board ship during cable laying operations.

In marine cable laying operations, a cable drum is mounted on board ship from which the cable is payed out during forward movement of the ship to lay the cable and by which the cable is heaved in during reverse movement of the ship in cable retrieving operations. For both the cable laying and retrieving operations, it is desirable to maintain a certain amount of tension on the cable. The problem of maintaining a tension on the cable is rendered difficult by reason of the fact that the speed of movement of the ship may vary during forward and reverse operation thereof. The problem of maintaining tension is rendered still more troublesome by reason of the movement of the body of water supporting the ship from which cable laying operations are conducted. In addition, the frictional forces encountered in the mounting for the cable drum and driving mechanism therefor are effective to apply tension to the cable during forward movement of the ship in cable laying operations, but are ineffective for this purpose during reverse operation of the ship for a cable retrieving operation in which case power must be supplied to overcome such frictional forces if the tension is to be maintained on the cable.

One of the principal objects of this invention is to provide a motor control system for controlling the operation of a cable drum used in marine cable handling operations which will be effective to maintain a predetermined tension on the cable under all conditions of operation.

A further object of this invention is to provide a motor control system for controlling the operation of a cable drum which will be effective to compensate for the effects of frictional forces on the cable tension in accordance with the movement of the ship from which the cable handling operations are conducted.

A still further object of the invention is to provide a motor control system for maintaining substantially constant the force applied by a motor to a load under conditions varying from an overhauling operation of the motor by the load to a motoring operation in which the motor is effective to move the load.

Other objects and advantages of the invention will become apparent from the following description.

Figure 2:
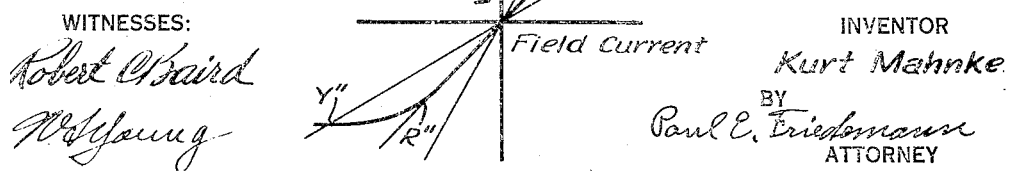

In the drawing there is shown a preferred embodiment of the invention. In this showing:

Figure 1 is a diagrammatic illustration of a motor control system showing its application to a cable carrying reel for use in marine cable handling operations, and Fig. 2 is an explanatory curve.

Referring to the drawing, the numeral 1 designates a ship from which the cable handling operations are to be conducted with respect to a body of water 2 in which the cable laying ship 1 is operating. A pulley 3 is mounted on the stern of the ship 1 for guiding a cable 4 to or from a drum 5. The cable 4 is delivered to the drum from the cable supply reserve positioned within the interior of the ship as indicated. During reverse operation of the ship to retrieve cable from the water 2, the cable will be heaved in by the drum 5, and during forward movement of the ship to lay cable in the water 2, the cable will be payed out from the drum 5. Under both of these conditions of operation, the drum 5 must exert a torque in a clockwise direction as indicated by the arrow 6 if tension is to be maintained on the cable 4.

In order to control the operation of the drum 5 so that it will be effective to exert a constant torque in a direction as indicated by the arrow 6, a direct current motor 7 is mechanically connected to the drum 5 as diagrammatically indicated by the broken line 8. A variable voltage generator 9 is provided for energizing the motor 7. The motor 7 is provided with a separately excited field winding 10 connected to a suitable source of direct current potential such as through the direct current buses 11. The excitation of the field winding 10 is controlled by an adjustable resistor 12 and the operation of the motor 7 is controlled by varying the output voltage of the generator 9. The output voltage of the generator 9 is controlled by varying the strength of the field winding 13 which is energized by a regulating generator 14. The regulating generator 14 is provided with a self-excited field 15 and an adjustable resistor 16 both connected in series with its armature circuit. The operating characteristic of the regulating generator 14 is controlled by the series field winding 15, and its output is regulated by a pattern field winding 17 and a regulating field winding 18. The regulating field winding 18 has its terminals connected across a resistor 19 which is connected in series with the armature circuit of the motor 7 and generator 9, so that the excitation strength of the regulating winding 18 will be responsive to changes in the current flowing in the armature circuit 20.

The pattern field winding 17 has its terminals connected to a double pole, double throw switch 21. In the upper position of the switch 21, stationary contacts 22 will be engaged to connect the winding 17 to one of the direct current buses 11 through the lead 23 and to the other of the direct current buses 11 through a resistor 24 and an adjustable rheostat 25. The resistor 24 may be shunted out of the circuit of the pattern field winding by a lead 26 connected to a stationary contact 27 and a lead 28 connected to a movable contact 29. The movable contact 29 is secured to an arm 30 which is frictionally mounted on a shaft 31 which is mechanically connected to the reel 5 for rotation therewith, as diagrammatically indicated by the broken line 32. When the drum 5 rotates clockwise, the frictional mounting of the arm 30 will be effective to move the contact 29 into engagement with the stationary contact 27 and shunt the resistor 24 out of the circuit of the pattern field 17. Under this condition, maximum excitation will be applied to the pattern field 17. When the drum 5 moves in a counterclockwise direction during a cable laying operation, the contact 29 will be disengaged from the contact 27 and the resistor 24 will be inserted in the energizing circuit for the pattern field 17.

In the lower position of the switch 21, the contacts 34 will be engaged to place the pattern field winding 17 under the control of a reversing controller indicated as a whole by the numeral 35. The reversing controller 35 comprises a rheostat 36 having a manually operable movable element 37 and a drum contactor 38 connected to the movable element 37 for movement therewith as indicated by the broken line 33. The drum contactor 38 is provided with reversing contacts R1, R2 and R3, and forward contacts F1, F2 and F3. When the movable element 37 is moved in a clockwise direction, the contacts F1, F2 and F3 will be moved to closed positions connecting the pattern field 17 to the direct current buses 11 through the upper half 39 of the resistance element of the rheostat 36. Upon movement of the movable element 37 in a counterclockwise direction from the position shown, the contacts R1, R2 and R3 will operate to reverse the connections of the field winding 17 across the direct current buses 11 and such reversing connection will be through the lower half 40 of the resistance element of the rheostat 36. Movement of the movable element 37 beyond the positions in which the contacts of the drum contactor 38 are closed will be effective to vary the energization of the pattern field winding 17.

The regulating field winding 18 is differentially related to the pattern field winding 17. In this manner when the load conditions on the motor 7 change in a direction tending to cause the motor 7 to draw increased current, the drop across the resistor 19 will increase and the excitation of the winding 18 will be increased. The increase in the excitation of the winding 18 will effect a net decrease of the excitation on the regulating generator 14 to thereby decrease the energization of the control winding 13 and the voltage output of the generator 9 an amount sufficient to compensate for the change in load conditions on the motor 7 and to thereby maintain the torque development by the motor 7 at a substantially constant value. When the load on the motor 7 changes in an opposite direction tending to cause it to draw less current, the regulating winding 18 will function in a reverse manner to increase the output of the generator 9 to maintain the torque developed by the motor 7 at a substantially constant value.

When the ship 1 is moving in a forward direction during cable laying operations, the drum 5 will be rotated in a counterclockwise direction to pay out cable, and the motor 7 will be overhauled by the force exerted by the cable 4 on the drum 5. Under this condition, the frictional forces of the mounting of the drum 5 and the mechanical connections of the drum 5 to the motor 7 will be available as a force maintaining a tension on the cable 4 to which is added the torque of the motor 7. As the speed of forward movement of the ship increases, the motor 7 will tend to draw more current and the winding 18 will then function to reduce the output of the generator 9 to maintain the torque exerted by the motor 7 at a constant value as explained above. Similarly, for decreasing speeds of operation of the ship 1, the output of the generator 9 will be increased as explained above to maintain the torque developed by the motor 7 at a substantially constant value.

It will be recalled that during forward movement of the ship 1, the contact 29 is disengaged from the contact 27 and the resistor 24 is in the circuit of the pattern field winding 17, thereby providing minimum excitation strength of the pattern field winding 17. When the operation of the ship 1 is reversed to retrieve cable, the frictional forces provided by the mounting of the cable carrying drum 5 and its mechanical connections to the motor 7 are no longer available to exert a tension on the cable 4. Under this condition of operation, the motor 7 must develop more torque if the tension is to be maintained on the cable 4. This is accomplished by movement of the contact 29 into engagement with the contact 27 to short-circuit the resistor 24 and increase the strength of the pattern field winding 17. This increase in the strength of excitation of the pattern field winding 17 will increase the output of the generator 9 and thereby cause the motor 7 to develop more torque. The increase in torque to be developed by the motor 7, in order to maintain the cable tension constant during cable retrieving operations, will be found to be equal to twice the frictional force which is available as a tension producing force during forward operation of the ship.

The regulating generator 14 is effective to amplify the regulating corrective intelligence supplied to the regulating winding 18. This is accomplished by adjusting the resistor 16 to a critical value providing what is termed herein as "instable" operation of the regulating generator 14. What is meant by instable operation will be best understood by referring to the explanatory curve of Fig. 2, which shows the saturation curve X of a direct current series generator, such as the regulating generator 14. As is well known, stable operation of a series generator is possible only if the resistance of its field circuit is less than that of a line R tangent to the saturation curve X, such as a resistance corresponding to the line Y. For a resistance corresponding to the line Y, the generator voltage will build up to a point of intersection of the line Y with the saturation curve X, such as the point Y' or Y" and stable operation will be had at such points and other points outwardly along the saturation curve X. For a resistance greater than the line R tangent to the saturation curve X, such as a resistance corresponding to the line Z, the generator voltage cannot build up. For a resistance in the load circuit of a series generator corresponding to the line R, the generator voltage may have a value equal to any of the ordinates along the line of tangency of the line R with the saturation curve X. The resistor 16 is adjusted to a critical value for the regulating generator 14 corresponding to the line R so that the output of the generator 14 may be regulated between the points R' and R" along the straight line portion of its saturation curve. From the foregoing, it will be understood that when the generator is described as having instable operation herein and in the claims, there is many a generator of the self-excited type having the resistance of its load circuit adjusted to a value at which it may be regulated substantially along the straight line portion of its saturation curve.

With the generator 14 adjusted for instable operation in the manner described above, external field control must be provided to hold its output steady at a given point between the points R' and R" and to regulate its output with respect to such points. This external field control is provided by the windings 17 and 18 which, as pointed out above, are differentially related. Under normal conditions of operation, the rheostats 25 and 12 will be adjusted so that the windings 17 and 18 will just balance each other. Under this condition, the series field winding 15 will supply the excitation controlling the output of the generator 14 at a given point along the straight line portion R of its saturation curve. Any tendency of the output of the generator 14 to drift from this condition will be immediately corrected by a regulating action through the regulating winding 18 which will function to hold the action of the regulating generator 14 constant for a given condition of operation.

For changing conditions of operation, the regulating winding 18 will function to maintain the torque developed by the motor 7 substantially constant as described above. Adjustment of the rheostat 25 will function to change the excitation strength of the pattern field winding 17 and thereby the torque developed by the motor 7 for a given condition of operation.

From the foregoing, it will be noted that the regulating winding 18 is effective to maintain a substantially constant tension on the cable 4 during operation of the ship in a given direction. By reason of the resistance 24 and the manner in which such resistance is cut into and out of the circuit of the pattern field winding 17, it will also be noted that the control apparatus of this invention is effective to maintain the tension on the cable 4 regardless of whether the motor 7 is being overhauled by the cable 4 or operating the drum 5 to retrieve the cable 4. Attention is particularly invited to the fact that the control apparatus of this invention is effective to compensate for movement of the ship by the body of water on which it is operating, which movement would be otherwise effective to constantly vary the tension of the cable 4. Attention is also invited to the fact that the provision of the switch 21, together with the control apparatus 35, provides an improved arrangement wherein the reel 5 is operated as a winch.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. Apparatus for laying marine cables comprising a cable drum to be mounted on board a cable laying ship, a direct current motor connected to said drum, means controlling the operation of said motor including a regulating generator having a variable output, a pattern field winding providing the base excitation of said generator, means responsive to the direction of rotation of said drum for regulating said winding to provide a predetermined base excitation when said drum is overhauling said motor and an increased base excitation at other times, and a control field winding differentially related to said pattern field winding and responsive to the current drawn by said motor for maintaining the torque developed by said motor and thereby the tension on said cable substantially constant.

2. Apparatus for laying marine cables comprising a cable drum to be mounted on board a cable laying ship, a direct current motor connected to said drum, means controlling the operation of said motor including a regulating generator having an armature, a resistance, and a self-excited field connected in a series circuit, said resistance being adjusted to a critical value providing instable operation of said generator such that a slight variation of its field excitation by an external force will cause an amplified variation in the output of said generator, and external field control means for said generator comprising a pattern field winding controlling the base excitation of said generator, means responsive to the direction of rotation of said drum for regulating said winding to provide a predetermined base excitation when said drum is overhauling said motor and an increased base excitation at other times, and a control field winding differentially related to said pattern field winding and responsive to the current drawn by said motor for maintaining the torque developed by said motor and thereby the tension on said cable substantially constant.

3. A control system for a marine cable drum to be mounted on board ship for use in cable laying operations in which the cable is payed out during forward operation of the ship and is heaved in during reverse operation of the ship comprising a direct current motor connected to said drum, a variable voltage generator for energizing said motor, and means controlling the output of said generator and thereby the operation of said motor comprising a generator field winding, a regulating generator for energizing said field winding having an armature, a resistance, and a self-excited field winding connected in a series circuit, said resistance being adjusted to a critical value providing instable operation of said regulating generator such that a slight variation of its field excitation from an external source will result in an amplified output of said regulating generator, and external field control means for said regulating generator comprising a pattern field winding for providing the base excitation of said regulating generator, means responsive to the direction of rotation of said drum for regulating said pattern field winding to provide a predetermined base excitation when said drum is overhauling said motor and an increased base excitation at other times, and a control field winding differentially related to said pattern field winding and responsive to the current drawn by said motor, said differential field winding being operable to decrease the excitation of said regulating generator in response to changing load conditions on said motor causing it to draw increased current and to increase the excitation of said regulating generator in response to changing load conditions causing it to draw decreased current, the joint operation of said self-excited field winding, pattern field winding, and control field winding being operable to regulate the operation of said motor to maintain a constant tension on said cable.

4. In a system for regulating the force applied to a load, the combination of a direct current motor connected to said load, and control means for said motor comprising a variable voltage genator for energizing said motor, a field winding for exciting said generator, a regulating generator for energizing said generator field winding, said regulating generator having an armature, a resistance, and a self-excited field winding connected in a series circuit, said resistance being adjusted to a critical value providing instable operation of said regulating generator such that a slight variation of its field excitation from an external source will result in an amplified output therefrom, and external field control means for said regulating generator comprising a pattern field winding for providing the base excitation of said regulating generator, means regulating said pattern field winding for providing predetermined base excitation thereon when said load is overhauling said motor and an increased base excitation at other times, and a control field winding differentially related to said pattern field winding and responsive to the current drawn by said motor, said differential field winding being operable to decrease the excitation of said regulating generator in response to changing load conditions on said motor causing it to draw increased current and to increase the excitation of said regulating generator in response to changing load conditions tending to cause said motor to draw decreased current, the joint operation of said self-excited field winding, pattern field winding, and control field winding being operable to regulate the operation of said motor to maintain a substantially constant force applied to said load.

5. A control system for a marine cable drum to be mounted on board ship for use in cable laying operations in which the cable is paid out during forward operation of the ship and is heaved in during reverse operation of the ship, comprising a direct-current motor for connection with said drum, a variable-voltage generator connected with said motor for energizing said motor, said generator having field control means responsive to the current drawn by said motor for varying the output of said generator to maintain the torque on said motor at a substantially constant magnitude, and control means responsive to the running direction of said motor and connected with said field control means to reduce said magnitude when the drum load on said motor is overhauling.

6. A control system for a cable laying and retrieving drum aboard ship, comprising a motor for connection to said drum, a generator having an armature circuit in common with said motor and having field control means for varying the energization of said motor, said field control means comprising two control circuits differentially related to each other as regards their respective control effects on said energization, one of said control circuits having current-supply means of normally constant voltage and having resistance means for controlling said effective value of said voltage, said other control circuit being connected with said armature circuit to be excited by variable voltage dependent upon said energization for controlling said generator to maintain the torque on said motor at a magnitude determined by said value, and control means responsive to the running direction of said motor and connected with said resistance means for changing said value so as to reduce said torque magnitude when the drum load on said motor is overhauling.

7. A control system for a cable laying and retrieving drum aboard ship, comprising a motor for connection to said drum, a generator having an armature circuit in common with said motor and having field control means for varying the energization of said motor, said field control means comprising two control circuits differentially related to each other as regards their respective control effects on said energization, one of said control circuits having current-supply means of normally constant voltage and having a series resistor for controlling the effective value of said voltage, said other control circuit being connected with said armature circuit to be excited by variable voltage dependent upon said energization for controlling said generator to maintain the torque on said motor at a magnitude determined by said value, and a contact device electrically connected across said resistor and mechanically coupled with said motor so as to short-circuit said resistor in order to reduce said torque magnitude when said motor is overhauled in opposition to said torque.

8. A control system for a cable laying and retrieving drum aboard ship, comprising a motor for connection to said drum, a generator having an armature circuit in common with said motor and having field control means for varying the energization of said motor, said field control means comprising two mutually differential field windings, current-supply means of normally constant voltage and a resistor series connected with one of said windings, a series impedance member in said armature circuit, said other winding being connected across said impedance member to be energized by variable voltage dependent upon the current of said armature circuit for varying said energization so as to maintain the torque on said motor at a magnitude determined by the resistance value of said resistor, and direction-responsive contact means mechanically coupled with said motor and electrically connected across said resistor for shorting said resistor in order to reduce said resistance value and said torque when said motor is overhauled in opposition to said torque.

9. A control system for a cable laying and retrieving drum aboard ship, comprising a motor for connection to said drum, a main generator having an armature circuit in common with said motor and having a field winding for controlling the energization of said motor, a regulating generator having an armature circuit connected with said field winding and having a self-excited field winding energized from said armature and two separately excited and mutually differential control windings, current-supply means of normally constant voltage and a resistor series connected with one of said control windings, current-responsive circuit means connecting said other control winding with said common armature circuit for exciting said other control winding in accordance with the motor current for controlling said energization to maintain the torque of said motor at a magnitude determined by the resistance value of said resistor, and direction-responsive contact means mechanically coupled with said motor and electrically connected across said resistor for shorting said resistor in order to reduce said resistance value and said torque when said motor is overhauled in opposition to said torque.

KURT MAHNKE.

REFERENCES CITED

The following references are of record in the file of this patent:

UNITED STATES PATENTS

| Number | Name | Date |
| --- | --- | --- |
| 2,300,988 | Stephenson | Nov. 3, 1942 |
| 2,367,956 | Mahnke | Jan. 23, 1945 |